(12) United States Patent
Sundaram et al.

(10) Patent No.: US 8,868,618 B2
(45) Date of Patent: Oct. 21, 2014

(54) USAGE-OPTIMIZED TABLES

(75) Inventors: Naresh Sundaram, Redmond, WA (US); Marcus E. Markiewicz, Mercer Island, WA (US); Brett A. Shirley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 116 days.

(21) Appl. No.: 12/968,124

(22) Filed: Dec. 14, 2010

(65) Prior Publication Data
US 2012/0150917 A1 Jun. 14, 2012

(51) Int. Cl.
G06F 17/30 (2006.01)
G06F 7/00 (2006.01)

(52) U.S. Cl.
USPC .......................................... 707/803

(58) Field of Classification Search
USPC .......................................... 707/803
See application file for complete search history.

(56) References Cited

U.S. PATENT DOCUMENTS

| | | | |
|---|---|---|---|
| 5,353,410 A | 10/1994 | Macon, Jr. et al. | |
| 6,574,639 B2 | 6/2003 | Carey et al. | |
| 7,490,084 B2 | 2/2009 | Kothuri et al. | |
| 2003/0028550 A1* | 2/2003 | Lee et al. | 707/200 |
| 2005/0149584 A1* | 7/2005 | Bourbonnais et al. | 707/204 |
| 2005/0235001 A1 | 10/2005 | Peleg et al. | |
| 2006/0184279 A1* | 8/2006 | Okamoto et al. | 700/245 |
| 2007/0198541 A1* | 8/2007 | Betz et al. | 707/100 |
| 2009/0319550 A1 | 12/2009 | Shau et al. | |
| 2011/0093457 A1* | 4/2011 | Kobayashi | 707/723 |

FOREIGN PATENT DOCUMENTS

CN 101685471 A 3/2010

OTHER PUBLICATIONS

Morales et al.: Oracle® Database Administrators Guide 11g Release 1 (11.1), B28310-04, Mar. 2008.*
Debnath et al., May 3-7, 2010, "Deferred Updated for Flash Based Storage", 13 pages, http://www.article.umn.edu/papers/lazy-update-SSD.
Sipani et al, 2002, "Designing an XML Database Engine: API and Performance", 7 pages, http://citeseerx.ist.psu.edu/viewdocklownload?doi=10.1.1.124.1881&rep=repl&type=pdf.
An et al., 2003, "Improving Performance with Bulk-Inserts in Oracle R-Trees", 4 pages, http://www.vldb.org/conf/2003/papers/S28P02.
Zhou et al., Sep. 23-28, 2007 "Lazy Maintenance of Materialized Views", 12 pages, http://citeseerx.ist.psu.edu/viewdoc/download-?doi=10.1.1.106.4696&rep=repl&type=pdf.
Chinese 1st Office Action and Search Report in Application 201110443136.6, mailed Jan. 6, 2014, 12 pgs.

* cited by examiner

*Primary Examiner* — Kuen Lu
(74) *Attorney, Agent, or Firm* — Louise Bowman; Jim Ross; Micky Minhas

(57) ABSTRACT

Systems and methods are disclosed for employing usage-optimized tables with a computer database system. In one embodiment, the database system stores create, update, and delete database operations in the usage-optimized table. The create, update, and delete database operations remain in the usage-optimized table until a flush condition is reached. When the flush condition is reached, the create, update, and delete operations are transferred to their corresponding real tables. In embodiments, the read operation does not flush the contents of the usage-optimized table to the real table. In such embodiments, the database system modifies read operations to account for data resident on the usage-optimized tables.

20 Claims, 5 Drawing Sheets

USAGE-OPTIMIZED TABLES

BACKGROUND

Input/Output ("I/O") operations are costly in a large database system. Large database systems manage thousands, if not millions, of different tables. Such database systems continually receive I/O requests related to many different tables resident in the database system. Often, the I/O requests are related to tables that are not currently loaded and/or resident in memory. In order to perform the request, the database system must allocate memory or reuse database cache resources and load the target tables. In large database system, the allocation and loading of a table is often required for each I/O request. It is with respect to this general environment that embodiments of the present disclosure have been contemplated.

Although specific problems have been addressed in this Background, this disclosure is not intended in any way to be limited to solving those specific problems.

SUMMARY

Embodiments of the present disclosure relate to systems and methods for employing a computer database system with usage-optimized tables. In embodiments, database commands are placed in a usage-optimized table, also referred to herein as an "OT". The OT is associated with multiple real tables in the database system. The OT stores an instance of database commands that are targeted towards real tables with which the OT is associated. The database commands remain in the OT until a flush condition is reached, at which point the database requests are transferred to the associated real tables.

In one embodiment, a read command does not flush the contents of the OT to the real tables. The computer database executing the read command may takes into account that some of the data requested by the read command is resident on the OT. Thus, the computer database system may also check the OT when performing a read I/O operation. In further embodiments, the results of the read operation, and optionally other anticipated read operations, are also placed into the OT in order to increase the efficiency of the database system.

Further embodiments of the present disclosure relate to transferring I/O operations stored on the OT to the multiple real tables associated with the OT. In the described embodiments, transferring the I/O operations occurs upon reaching a flush condition. However, in certain circumstances it may be more efficient to disregard the flush condition and continue using the OT rather than transferring its contents to the underlying real tables. In such circumstances, the OT may be modified in order to continue to store database commands, or records requests. In further embodiments, the I/O operations remain on the OT indefinitely.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

DETAILED DESCRIPTION

Figure 1:
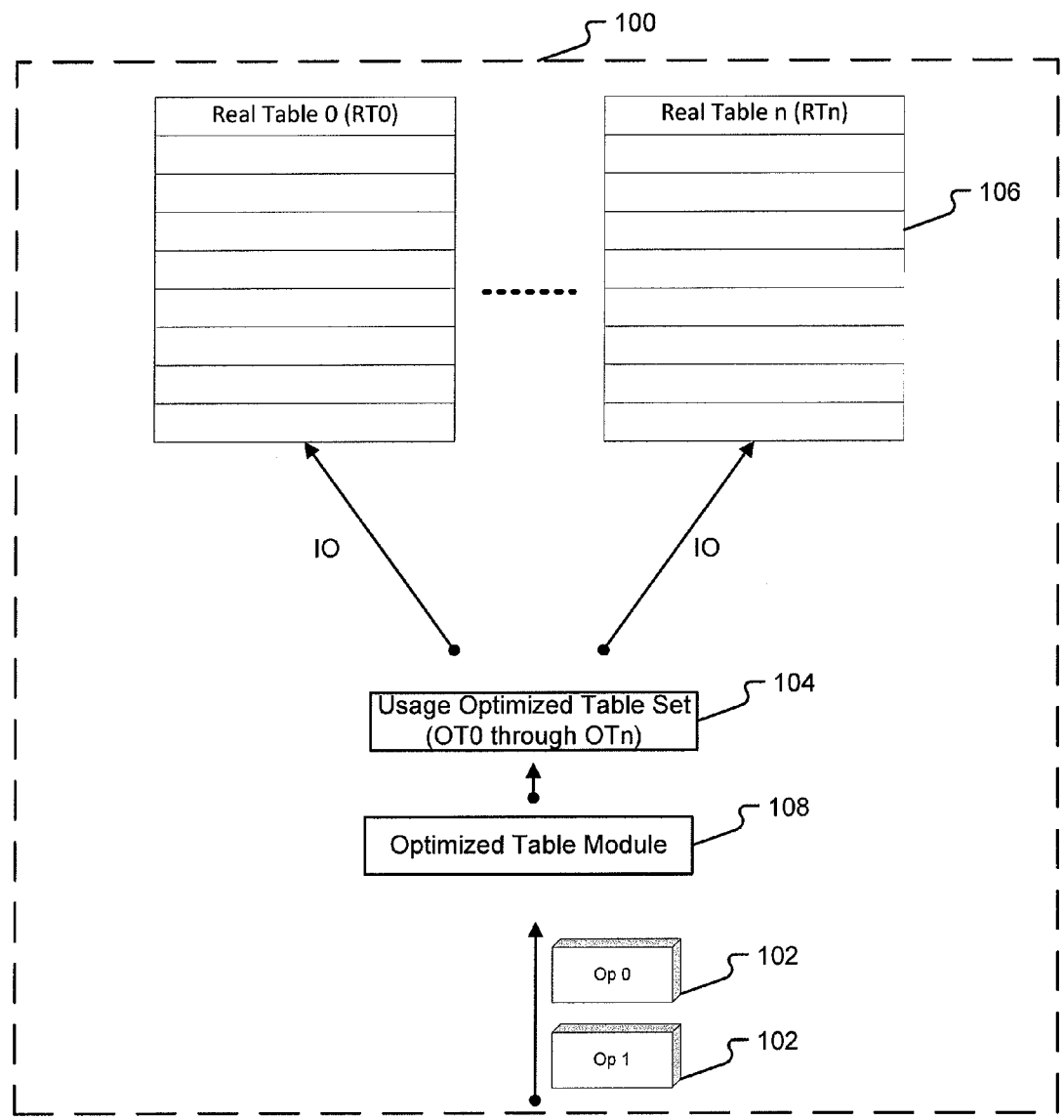
FIG. 1 is an embodiment of a schematic diagram representing the architecture of a database system 100 with usage-optimized tables.

This disclosure will now more fully describe exemplary embodiments with reference to the accompanying drawings, in which some of the possible embodiments are shown. Other aspects, however, may be embodied in many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

Large database systems often manage thousand, if not millions, of relational tables. Often, these tables are related such that a single request to update and/or read data from one table requires updates and/or read of multiple tables. Generally, the targeted tables will not be loaded or present in the operable memory of the database. Thus, in order to perform the update and/or read request, the database is required to allocate memory and load multiple tables, thereby increasing the number of Input/Output ("I/O") operations required to perform a single update and/or read request. Because I/O operations are one of the most costly operations performed by a database, reducing the number of I/O operations performed by the database system greatly increases the operating efficiency of the system. An I/O operation may comprise two distinct operations. In a computer database system, an I/O operation may consist of loading a real table from persistent storage (e.g., a magnetic drive, a hard drive, a solid state drive, etc) into working memory (e.g., RAM) in order to perform a database command (e.g., a create, update, or delete command). In a distributed database (e.g., a database distributed across multiple computers or server, an I/O operation may comprise fetching a real table from a remote computer and loading the real table in the working memory of a local computer. Embodiments of the present disclosure reduce the number of times these costly I/O operations are performed by a database system.

Embodiments of the present disclosure relate to systems and methods for employing a database system with usage-optimized tables. In embodiments, database commands are placed in a usage-optimized table, also referred to as an "OT." The OT is associated with multiple real tables in the database system. The OT stores an instance of a database command and/or a record that involves an I/O request for each real table with which it is associated. The database commands remain in the OT until a flush condition is reached, at which point the database commands are transmitted to the real tables that are the targets of the database commands. Furthermore, in order to maintain compatibility with existing applications and overall simplicity, the usage-optimized tables are implemented in a transparent manner. In other words, applications and users of the database system may have no knowledge of the existence of the usage-optimized tables, let alone the content present in the OT's. Because, in embodiments, only the database system is aware of the usage-optimized table, it modifies its functionality with response to certain requests to account for the existence of the OT. A database system may be a database located on a single computer or a distributed database located across one or more computers or servers. In embodiments, the database system comprised both software and hardware. The software component of the database system may be used to perform the actions specified by database commands. The software component may also be operable to perform the systems and methods disclosed herein with respect to usage-optimized tables. The hardware components of the database system may include the persistent storage (e.g., magnetic drive, hard drive, solid state, etc) and the working memory (e.g., RAM) that is employed to store the usage-optimized and real tables. One embodiment of a database system of the present disclosure is discussed with respect to FIG. 5, hereinafter.

In order to maximize efficiency, database commands are stored in the OT until a flush condition is met. In embodiments, a read request does not trigger the OT table to transfer its contents to the one or more real tables that it is associated with. Thus, a database system utilizing usage-optimized tables accounts for the usage-optimized table when performing a read request. For example, if a read request targets a specific record, the database system first checks the OT for the specific record before retrieving the record from the real table. This step is performed automatically by the database system because the OT may contain the most up-to-date instance of the specific record and the requesting application or user is not aware of the existence of the OT. Also, a read may require the database system to perform stitch information from the OT and the real table in order to produce a requested view.

Embodiments of the present disclosure will now be discussed with respect to the accompanying figures. In order to clearly illustrate the features of the present disclosure, the embodiments will be further discussed with respect to example embodiments in which the usage-optimized tables are employed in a database system for e-mail management. One of skill in the art will appreciate that this specific embodiment is for illustrative purposes only. Embodiments of the present disclosure can be practice with any database system.

FIG. 1 is an embodiment of a schematic diagram representing the architecture of a database system 100 with usage-optimized tables. As previously described, the database system 100 may comprise both hardware and software components. The database system 100 comprises various components that reduce the amount of I/O operations that are typically required to load a table from persistent storage into working memory in order to perform an operation on a database table. The database system 100 may include an Optimized Table Module 108 that contains computer executable instructions and the logic to create usage-optimized tables and perform the methods disclosed herein. To increase efficiency, many of the database operations 102 received by the database system 100 are input into a set of one or more usage-optimized tables 104 by the Optimized Table Module 108. For example, in an e-mail database system, the set of usage-optimized tables may contain a usage-optimized table for each mailbox resident in the e-mail database system. Database operations may include create, update, delete, or any other type of read and/or write operations typically performed by a database. Each usage-optimized table is associated with one or more real tables 106. The real tables 106 are relational database tables used to store information in the database system. For example, in an e-mail management environment, real tables 106 might be used to store information related to a mailbox. Each mailbox may have multiple real tables associated with the mailbox to store information related to the different aspects and functionalities of the mailbox and/or related mailbox applications, such as a personal information manager (PIM) associated with a mailbox. The mailbox might have a real table 106 corresponding to each folder in the mailbox (e.g., an inbox folder, sent mail folder, deleted mail folder, etc). These tables may be used to store the e-mail messages and/or e-mail conversations present in each folder. The e-mail database may also contain different real folders 106 to store information related to an index for the mailbox, information related to different views for the mailbox, mailbox administration information (e.g., processing rules, account information, etc), mailbox account statistics (e.g., a count of the number of items in the mailbox, etc), and personal information, or any other type of information used by the mailbox.

While each of the real tables 106 may store different information, they may be related such that each I/O request made to the database system may involve multiple real tables. In an example e-mail database system, multiple tables may be updated upon receiving a message. For example, the folder table containing the e-mail message may be updated to include the message, the index table may be updated, and any account statistic tables may be updated. As illustrated by the e-mail example discussed above, a single database operation (e.g., an update operation) to the database system can result in multiple I/O requests in order to update all related tables. While the described example relates to an e-mail database system, many database systems face similar I/O requirements. Any single create, read, update, or delete operation performed by a database system may involve multiple tables and, therefore, result in multiple I/O operations in order to access each table.

However, with reference to FIG. 1 the database system 100 can reduce the number of I/O operations upon receiving a database operation 102 with usage-optimized tables. In such embodiments, the database system can create a set of usage-optimized tables that are associated with one or more of the underlying real-tables. In embodiments, a single usage-optimized table from the set of one or more usage optimized tables 104 is associated with related real tables 106. For example, the database table may create a usage-optimized table for each mailbox in the database system, thereby associating each of the mailboxes' real tables 106 with the usage-optimized table. Accordingly, a set of one or more usage optimized tables 104 may be provided in database system 100. Thereafter, each database operation directed towards the mailbox will be placed in the usage-optimized table rather than the mailbox's real tables 106. This reduces the amount of I/O required by the database system in two ways. First, because the database operations 102 are placed in the usage-optimized table 104, it is highly likely that the usage-optimized table was previously accessed and therefore already in memory, thereby preventing the database from performing an I/O operation to access the usage-optimized table 104. Second, even if an I/O operation is required to load the usage-optimized table 102, as previously described, a single database operation 102 may relate to multiple database tables which would require multiple I/O operations to perform the single command. However, because database operations are placed in a single usage-optimized table 104, in embodiments, less I/O commands will be required at the time that the multiple database operations 102 are transferred to the real tables 106. The usage-optimized table results in higher density and achieves spacial locality, thereby resulting in fewer I/O operations to perform storage.

In order to store database operations 102 for a number of real tables 106, the usage-optimized table 104 stores the commands in a schema independent manner. In embodiments, the usage-optimized table stores the database commands 102 as a binary large object (BLOB). Furthermore, the usage-optimized table identifies the real table 106 and the specific record that is the target of the database commands. This can be accomplished by modifying the key for entry into the usage-optimized table 104. In embodiments, the key for each entry consists of an ID (e.g., a table ID, a B-Tree ID, an object ID, etc.) for the real table 106 and the primary key of the record that is the target of the database command 102.

As will be described in further detail with respect to FIGS. 2 and 4, the database commands 102 remain in the usage-optimized table until a flush condition is reached. Upon reaching the flush condition, the contents of the usage-optimized table are transferred to the real tables 106 in an actualization process. Values that have been written to the usage-optimized table 104 by database operations committed before the actualization process are transferred to the real tables.

Similarly, database system 100, particularly Optimized Table Module 108, also accounts for the contents of the usage-optimized tables 104 when creating and returning a view. Because the usage-optimized tables 104 are implemented in a transparent manner, the database system 100 and the Optimized Table Module 108 automatically performs operations to stitch the usage-optimized table and real table data together in order to return an accurate view to an application and/or user.

While the database system 100 is described as storing database operation 102 in usage optimized tables 104, in an alternate embodiment the results (e.g., records, rows, etc.) of the database operations 102 may be stored in the usage optimized tables 104 rather than, or in addition to, the database operations themselves.

Figure 2:
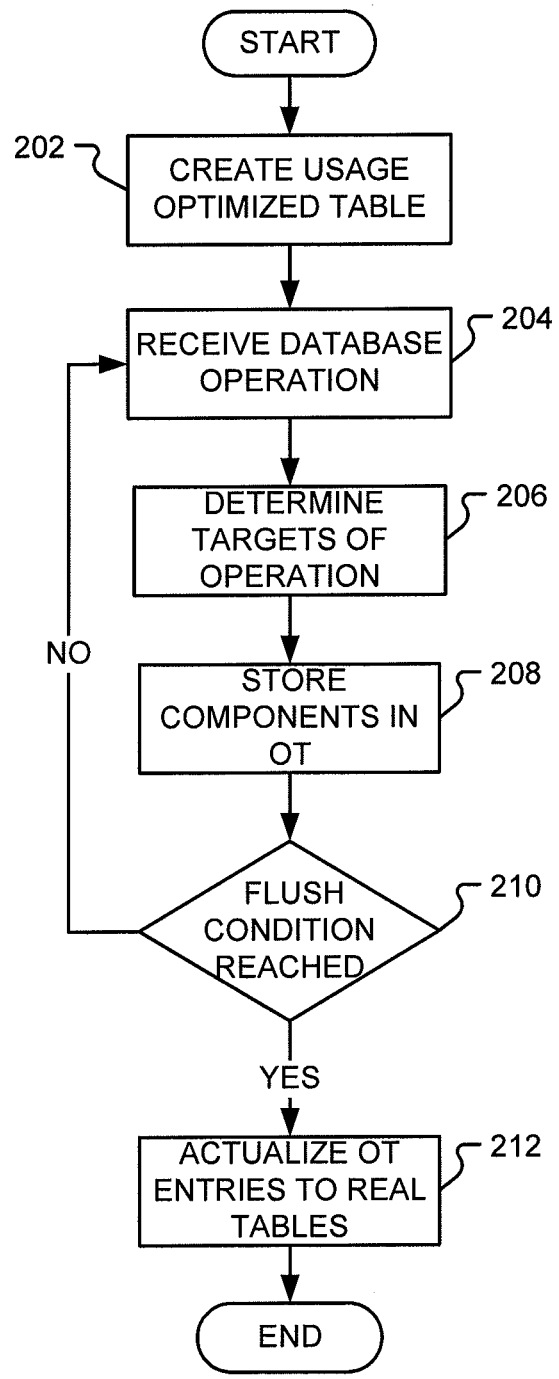
FIG. 2 is an embodiment of a method 200 for performing database operations using a usage-optimized table.

FIG. 2 is an embodiment of a method 200 for performing database operations using a usage-optimized table. In one embodiment, the method 200 may be performed by a database, a database management component operating in a database system, a database application, an external application interfacing with a database, or by any other type of application utilizing a database. The operations of method 200 may be implemented in hardware, software, or a combination of both. Flow begins at operation 202 in which a usage-optimized table is created. As previously described, the usage-optimized table will receive database operations (e.g., create, update, and delete operations) for multiple real tables. In embodiments, the usage-optimized table is a persistent table. In such embodiments, the usage-optimized table is persistently stored in the database along with the real tables. In embodiments, the usage-optimized table may be associated with specific real tables, either explicitly or implicitly. For example, the usage-optimized table may explicitly define the specific real tables for which it will receive operations. In other embodiments, a usage-optimized table may be implicitly associated with one or more real tables. For example, a usage-optimized table may be created to co-locate data that is recently updated or recently retrieved data to achieve high data density and better I/O characteristics. In this embodiment, the usage-defined table receives operations intended for one of the real tables. The usage-defined table may receive all operations, or a specific subset of operations. For example, the database may only place certain operations in the usage-optimized table.

After creating the usage-optimized table, flow proceeds to operation 204. At operation 204 database operations are received. In embodiments, the database operation may be a create operation, an update operation, a delete operation, or any other type of database operation known to the art. Flow proceeds to operation 206 in which the method 200 determines the targets of the database command. As discussed, a database command may have multiple targets. For example, receiving an e-mail may require an update to a folder table, an index table, a statistic table, or any other number of tables. Therefore, at operation 206, each component of the database operation is identified. In embodiments, identifying each component may require identification of all of the tables affected by the received database operation and actions that are to be performed are identified by the method 200. In embodiments, if the database operation received at operation 204 consists of multiple updates, the database operation is broken into the underlying actions that the database system may perform on affected real tables. Returning to the e-mail database example, a database operation related adding an e-mail message to a mailbox, multiple tables related to the mailbox may be updated, such as updating a folder table, an index table, and a statistics table. At operation 206, in this example, these three updates are identified. In an alternate embodiment, the components of the database command are identified before execution of the method 200. Each component may be individually received at operation 204. In this situation, operation 206 comprises identifying the target of the actions. For example, the target may be the real table that the action is directed towards, the record the action is directed towards, or a combination of both. Such information may be gathered, for example, by parsing the database command or by any other process known to the art.

After identifying the underlying actions, flow proceeds to operation 208. At operation 208, the database operation is stored in the usage-optimized table. In embodiments, the database operation is not stored as a single operation but as multiple operations that are performed to satisfy the command. Returning to the e-mail database example, if adding a message to a folder may require updates to a folder table, an index table, and a statistics table, these three updates are stored separately in the usage-optimized table. Instead of just storing the original database command at operation 208, each action that may be required to accomplish the database command is stored individually.

While method 200 has been discussed with respect to storing, rather than executing, the database commands in the usage-optimized table, another embodiment of method 200 involves executing the commands and storing the results in the usage-optimized table. Again referring to the e-mail database example, the results of the update to the folder table, the index table, and the statistic table may be stored at operation 208. Furthermore, this embodiment adds extra granularity to the storage aspect. For example, if the update only involves one column of a record, only the value of the column need be stored. The rest of the record does not have to be present in the usage-optimized table. This increases the storage efficiency of the usage-optimized table. In such embodiments, a column identifier may also be saved in the usage-defined table. Although not shown in FIG. 2, the database commands may be executed anytime before storage operation 208.

In embodiments, each command, component, or result is stored in the usage-optimized table as a BLOB and a key. By storing the value as a BLOB, the usage-optimized table is able to store any type of value without requiring knowledge of the value or the schemas of the databases real tables. The key is used to identify the target of the action. In embodiments, the key is used to identify the real table and the record that is the target of the action. In further embodiments, the key may further define a column identifier used to identify the location of a value stored in the usage-optimized table. As previously discussed, this information may be determined at operation 206. This information is used to identify the target of the action when the usage-optimized table is flushed.

After storing the database command, flow proceeds to decision block 210 in which it is determined if a flush condition is present. A flush condition is an indication that the commands and actions stored on the usage-optimized table should be actualized. Flush conditions are discussed in more detail with respect to FIG. 4. If the flush condition or conditions are not met, flow branches "No" and returns to operation 204 in which the method continues to received database commands and add the commands to the usage-optimized table. If the flush condition or conditions have been met, flow proceeds to operation 212 and the database command components or results are stored in the usage-command table are actualized, or transferred to their corresponding real tables. Transferring the database command components may comprise causing the commands to be performed on the real tables. Transferring the results may comprise writing the results to the real tables. In embodiments, the actualization process of storing the contents of the usage-defined tables comprises transferring the action to the real tables. One of skill in the art will appreciate that this can be accomplished in at least two ways, both of which are consistent with the operation of method 200. First, method 200 may actualize the commands by performing the database commands stored in the usage-optimized table. In this embodiment, the database commands are not performed until the usage-optimized table is flushed. In an alternate embodiment, some or all of the commands may have already been executed by the database. In this embodiment, rather than storing the database operations at 208, the resulting values of the operation are stored in the usage-optimized table. In this embodiment, the actualization process 212 involves the writing of these values to their corresponding real table(s) at operation 212.

As previously described, in embodiments the usage-optimized table is a persistent table that is stored in the database system along with the real tables. Because the usage-optimized table is flushed only in certain circumstances, when the database accesses a real table it accounts for related information in the usage-optimized table. Embodiments of the systems and methods disclosed herein accomplish this by maintaining dual currency for database objects (e.g., records, entries, values, tables, or any other type of database entity that is stored in the usage-optimized table). If a database object is located in a real table, the real table has currency of the object. However, a modified version of the object may also be maintained in the usage-optimized table. Thus, the database system may also set currency to the usage-optimized table. In embodiments, because the usage-optimized table will always contain the most up-to-date version of the object, any conflicts will always be resolved in the usage-optimized table's favor.

Figure 3:
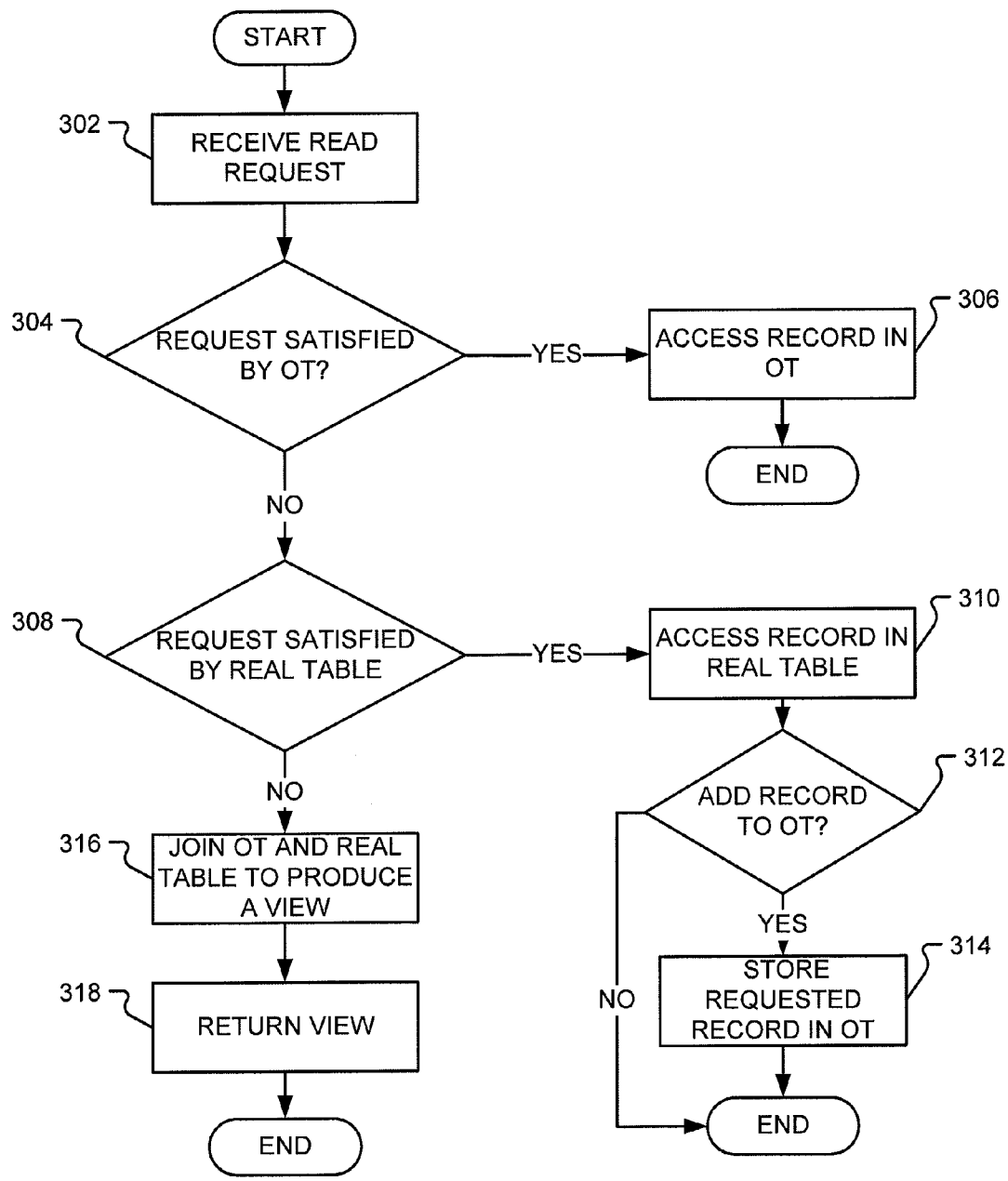
FIG. 3 is an embodiment of a method 300 for handling read operations with usage-optimized tables.

Because dual currency may exist, database systems pursuant to the present disclosure, such as database system 100 (FIG. 1) implements a method to handle read operations. FIG. 3 is an embodiment of a method 300 for handling read operations in a database environment that includes usage-optimized tables. Flow begins at operation 302 in which a request to read a record is received. Because usage-optimized tables are being utilized, the requested record may be resident on the usage-optimized table or the real table. Flow proceeds to operation 304 in which a determination is made as to whether the read operation is satisfied by the data in the usage-optimized table. Because the read operation identifies a real table, the determination can be made by performing an indexed search on the usage-optimized table. As previously discussed, the usage-optimized table contains the real table ID (e.g., a table ID, a B-Tree ID, an object ID, etc.) of each entry stored in the table. At operation 304, an indexed search for the real table ID of the usage-optimized table may be performed to determine whether the requested record is in the usage-optimized table. If the requested record is present in the usage-optimized table, flow branches "Yes" to operation 306 and the record is returned from the usage-optimized table. Flow then terminates.

In embodiments, a pending update command may reside in the usage-optimized table. Because the pending update command may not have been written to its corresponding real table, the database system extracts the update information from the pending update command and includes the information in the result of the read command.

If the requested record is not in the usage-optimized table, flow branches "No" to decision block 308 and a determination is made as to whether the read request can be satisfied by the records in an underlying real table. If the requested read record is located in a real table, flow branches "Yes" to operation 306 and the records of the real-table are accessed to perform the read operation. Flow then proceeds to decision operation 312 where a determination is made to add the read record or related data to the usage-optimized table. In embodiments, this determination can be based on many different factors. In another embodiment, the determination may be based upon the session configuration state of the database system. For example, in some configurations certain read data may be added. In one example, during a log on state for the database system, the database system may add read requested items to the usage-optimized table because these items will likely be accessed again. In other states only specific read requested items may be added. In such embodiments, these items may be determined and preset by an administrator or developer.

In another embodiment, the determination 312 of whether the read requested data should be added to the usage-optimized table may be based upon the data itself. In one such embodiment, the type of data may be a factor. For example, the database may set a rule that all read-requested data of a certain type is read into the usage-optimized table. In another embodiment, this determination may be based upon the size of the data returned in the read request. For example, if the return data is not too large, it may be stored on the usage-optimized table. Conversely, if it is too large, it may not be stored. In another such embodiment, the actual data itself may be used to determine whether or not it will be included in the usage-optimized table. In such embodiments, the determination may be based upon the purpose or use of the data. Returning to the e-mail database example, mailboxes often include a set of rules for processing e-mails (e.g., spam rules, processing rules, etc). Because these rules are accessed each time the mail is received, it may be determined that the rules are always stored in the usage-optimized table upon a read request.

In yet another embodiment, the determination 312 may be based upon access patterns. In embodiments, the access patterns may be statically defined. For example, the database may statically define a rule that if one item is read or accessed another item should be added to the usage-optimized table. In another embodiment, the access patterns may be dynamically determined by the database system based upon usage statistics or other system information. In addition to these individual factors, the determination at operation 312 may be based upon a combination of the various different factors.

Although specific examples of factors and policies have been described with respect to determining whether an entry will be made to the usage-optimized table after a read request, these factors and policies are provided as examples only and are not intended to limit the scope of the systems and methods disclosed herein. Other models may also be used such as, but not limited to, a most recently used approach, an AI-driven algorithm, or a predictive algorithm. One of skill in the art will appreciate that any number of models, factors, policies, and/or algorithms can be practiced alone or in combination with the systems and methods disclosed herein.

While operation 312 discusses factors which may be evaluated in determining whether an entry should be made to the usage-optimized table, one of skill in the art will appreciate that these factors may also be used for determining whether to add entries to the usage-optimized tables that arise in non-read requests. For example, the same factors may be employed to determine whether to add an entry to the usage-optimized table in the case of a create, an update, or a delete situation. Although not shown, these factors can also be employed with the method described in FIG. 2.

If it is determined that the record accessed at operation 310 should be added to the usage-optimized table, flow branches "Yes" to operation 314 in which the record is stored in the usage-optimized table as discussed with respect to FIG. 2. If it is determined that the record should not be added, flow branches "No" and the method terminates.

Returning to operation 308 in certain situations neither the usage-optimized table nor the real table can individually perform the read request received at operation 302. For example, the read request may be for a view. Because the view may contain data from both the usage-optimized table and the real table, both tables are read in order to perform the read request. In this situation, flow branches "No" to operation 316. At operation 316 the method 300 maintains currency on both the usage-optimized table and the real table and performs operations to stitch or join the usage-optimized table and the real table to produce an accurate and up-to-date view. The usage-optimized table and the real table may contain records that conflict. In embodiments, the usage-optimized table will always have the most up-to-date record information and, therefore, will always win in the case of conflicts. After creating the table at operation 316, flow proceeds to operation 318 and the view is returned. The returned view may then be displayed to a user. In further embodiments, the view may also be stored.

As described, create, read, update, and/or delete commands or the result from each command may be stored in the usage-optimized table. Because of that, the usage-optimized table will generally be present in the working memory (e.g., RAM) of the database system. Therefore, a minimal amount of I/O operations are required at the time that commands are issued. As discussed, the usage-optimized table is a persistent table that maintains its entries until a flush condition is reached. When the usage-optimized table is flushed, the entries from the usage-optimized table are actualized to their corresponding real tables. In some embodiments, actualization of the usage optimized table may not ever occur. For example, this may occur with small tables with data that remains static over time. In such circumstances, the table data remains co-located without impact to the actual schema or user visibility. At this time, the entries in the usage-optimized tables are transferred and thus eventually persisted to their corresponding real tables. In doing so, the writing of random updates, which commonly occur in a database system, is avoided leading to a greater coalescing of I/O operations.

In embodiments, the usage-optimized table is flushed in a manner such that entries in the usage-optimized table for a particular real table are transferred at the same time, for example, by performing a batch process. Over the lifetime of the usage-optimized table (e.g., from creation to flush or from flush to flush), this greatly reduces number of I/O operation needed to be performed. For example, the usage-optimized table may contain 10 entries pertaining to a specific real table. Because these are originally written to the usage-optimized table, I/O usage in writing the 10 entries is minimal compared to writing a single entry amortized over time. When the usage-entry table is flushed, these 10 entries are simultaneously written to their specific real table, which requires only a single I/O operation. On the other hand, without the usage-optimized table, these 10 operations would have been spread over time, which would require as many as 10 I/O operations to commit the operations to their table.

Many different conditions may be used to trigger a flush. For example, a flush can be triggered by a specific action, based upon the accessing a specific table, based upon a command from the database system or another application, based upon a timer, or based upon any other type of condition or trigger known to the art. One of skill in the art will appreciate that any type of trigger can be practiced with the systems and methods disclosed herein.

In one embodiment, the flush may be triggered based upon the size of the usage-optimized table. In order to limit I/O operations the usage-optimized table may not be allowed to grow too large, otherwise multiple I/O operations may be required for the usage-optimized table. In embodiments, the size of the usage-optimized table depends upon the underlying medium used to store the database. In one embodiment, the size of the usage-optimized table is equal to the size of memory accessed in a single I/O operation upon the underlying medium.

Figure 4:
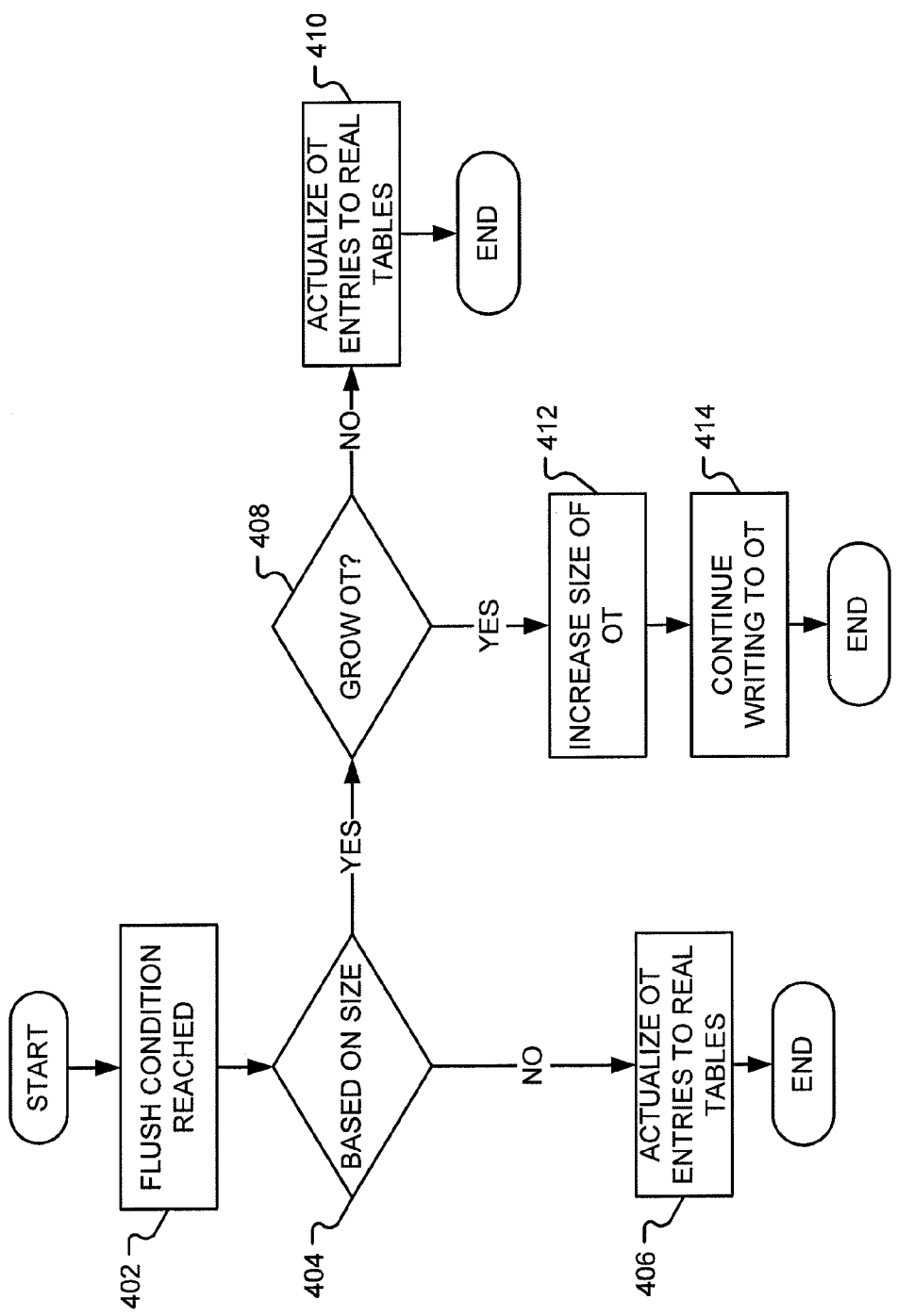
FIG. 4 is an embodiment of a method 400 for triggering a flush of a usage-optimized table.

FIG. 4 is an embodiment of a specific method 400 for triggering a flush of a usage-optimized table. Flow begins at operation 402 where a determination is made that a flush condition has been reached. Flow proceeds to decision block 404 in which the method 400 determines if the flush condition is based upon size. As previously noted, there may be many different types of triggers for writing the usage-optimized table's contents to real tables. In most cases, once the condition is met, the flush should automatically occur. In such situations, flow branches "Yes" to operation 406 and the contents of the usage-optimized table are transferred to the real tables. However, if the condition is based upon the size, flow branches yes to decision block 408.

At decision block 408 a determination is made as to whether the usage-optimized table should be allowed to grow. In certain circumstances, it may increase efficiency to allow the usage-optimized table to grow rather than writing the contents to the real tables. For example, if the size limit is reached during a time when many transactions are taking place, it may be more efficient to delay writing the contents of the usage-optimized table until the rate of transactions slow. In such embodiments, flow branches "Yes" to operation 412 in which the size of the usage-optimized table is increased. In one embodiment, the usage-optimized table may be increased by an additional page size. In other embodiments, the usage-optimized table may be increased by the size of a single I/O read of the storage medium used to store the table.

Flow then proceeds to operation 414 in which the database continues to enter operations and/or results to the usage-optimized table, as described with respect to FIGS. 2 and 3. The method then terminates.

Returning to decision block 408 if it is not efficient to increase the size of the usage-optimized table, flow branches "No" to operation 410 and the contents of the usage-optimized table are transferred to the real tables.

Figure 5:
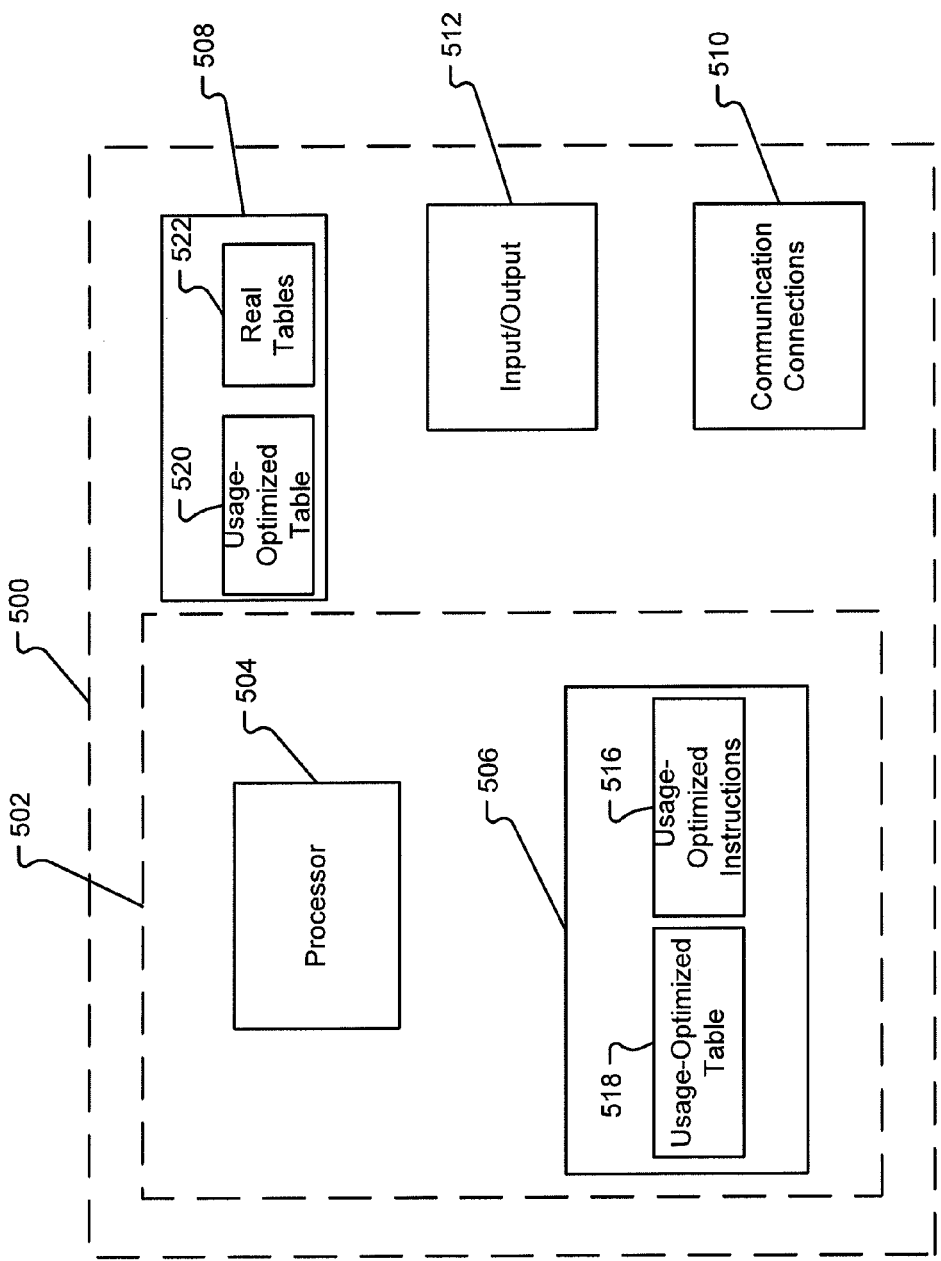
FIG. 5 illustrates an embodiment of a computer environment and computer system 500 for implementing the methods disclosed herein.

With reference to FIG. 5, an embodiment of a computing environment for implementing the various embodiments described herein includes a computer system, such as computer system 500. Any and all components of the described embodiments may execute as or on a client computer system, a server computer system, a combination of client and server computer systems, a handheld device, and other possible computing environments or systems described herein. As such, a basic computer system applicable to all these environments is described hereinafter.

In its most basic configuration, computer system 500 comprises at least one processing unit or processor 504 and system memory 505. The most basic configuration of the computer system 500 is illustrated in FIG. 5 by dashed line 502. In some embodiments, one or more components of the described system are loaded into system memory 506 and executed by the processing unit 504 from system memory 506. Depending on the exact configuration and type of computer system 500, system memory 506 may be volatile (such as RAM), non-volatile (such as ROM, flash memory, etc.), or some combination of the two.

Additionally, computer system 500 may also have additional features/functionality. For example, computer system 500 includes additional storage media 508, such as removable and/or non-removable storage, including, but not limited to, magnetic or optical disks or tape. In some embodiments, software or executable code and any data used for the described system is permanently stored in storage media 508. Storage media 508 includes volatile and non-volatile, removable and non-removable media implemented in any method or technology for storage of information such as computer readable instructions, data structures, program modules, or other data. In embodiments, the persistent usage optimized tables 520 and real tables 522 are stored in storage media 508. In embodiments, the persistent usage optimized tables 520 and real tables 522 are loaded into system memory 506 in order to perform a database operation on the tables. In such an embodiment, loading the persistent usage optimized table 520 and the real tables 522 into system memory 506 requires an I/O operation.

System memory 506 and storage media 508 are examples of computer storage media. Computer storage media includes, but is not limited to, RAM, ROM, EEPROM, flash memory or other memory technology, CD-ROM, digital versatile disks ("DVD") or other optical storage, magnetic cassettes, magnetic tape, magnetic disk storage, other magnetic storage devices, solid state storage, or any other medium which is used to store the desired information and which is accessed by computer system 500 and processor 504. Any such computer storage media may be part of computer system 500. In embodiments, system memory 505 and/or storage media 508 stores data used to perform the methods and/or form the system(s) disclosed herein, such as, creating a derived table and performing a method of inheriting growth patterns. In embodiments, system memory 506 stores information such as usage-optimized tables 518 and table data 514 and usage-optimized instructions 516 (e.g., Optimized Table Module 108) for performing the methods disclosed herein.

Computer system 500 may also contain communications connection(s) 510 that allow the device to communicate with other devices. In embodiments, communications connection (s) 510 may be used to transmit and receive messages between sender devices, intermediary devices, and recipient devices. Communication connection(s) 510 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In distributed database embodiments, communications connection(s) 510 may be used to retrieve a remote table and load it into the working memory of a local computer system by performing an I/O operation.

In some embodiments, computer system 500 also includes internal and external input and output connections 512, and interfaces and peripheral devices, such as a graphical user interface. Input device(s) are also referred to as user interface selection devices and include, but are not limited to, a keyboard, a mouse, a pen, a voice input device, a touch input device, etc. Output device(s) are also referred to as displays and include, but are not limited to, cathode ray tube displays, plasma screen displays, liquid crystal screen displays, speakers, printers, etc. These devices, either individually or in combination, connected to input and output connections 512 are used to display the information as described herein. All these devices are well known in the art and need not be discussed at length here.

In some embodiments, the component described herein comprise such modules or instructions executable by computer system 500 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 500 is part of a network that stores data in remote storage media for use by the computer system 500.

This disclosure described some embodiments with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although the embodiments have been described in language specific to structural features, methodological acts, and computer-readable media containing such acts, it is to be understood that the possible embodiments, as defined in the appended claims, are not necessarily limited to the specific structure, acts, or media described. One skilled in the art will recognize other embodiments or improvements that are within the scope and spirit of the present disclosure. Therefore, the specific structure, acts, or media are disclosed only as illustrative embodiments. The disclosure is defined by the appended claims.

What is claimed is:

1. A computer-implemented method for reducing the amount of I/O operations performed by a database system, the method comprising:
   creating a usage-optimized table, wherein the usage-optimized table stores database I/O operations for one or more real tables until a flush condition is satisfied;
   associating the usage-optimized table with the one or more real tables;
   receiving a database operation, wherein the database operation is directed towards at least two of the one or more real tables; and
   storing the database operation in the usage-optimized table.

2. The computer-implemented method of claim 1, further comprising:
   receiving a read operation;
   returning a result of the read operation;
   after returning the result of the read operation, determining that the usage-optimized table has reached a predetermined threshold; and
   transferring the database operation to the one or more real tables.

3. The computer-implemented method of claim 2, wherein the step of determining that the usage-optimized table has reached a predetermined threshold is based on a size of the usage-optimized table.

4. The computer-implemented method of claim 1, wherein the database operation is a write operation.

5. The computer-implemented method of claim 1, wherein storing the database I/O operation in the usage-optimized table further comprises storing the database I/O operation as a record comprising:
   a primary key; and
   a binary large object (BLOB) representing the database I/O operation.

6. The computer-implemented method of claim 5, wherein the primary key comprises an ID of a selected real table and a key of a record in the selected real table.

7. The computer-implemented method of claim 1, wherein only relevant portions of the records are stored in the usage-optimized table.

8. The computer-implemented method of claim 1, wherein storing the database I/O operation in the usage-optimized table further comprises storing a separate entry in the usage-optimized table for each of the one or more real tables that the database I/O operation is directed towards.

9. A system for reducing the number of I/O operations performed in a database environment, the system comprising:
   at least one processor; and
   a memory coupled to the at least one processor, the memory comprising computer executable instruction that, when executed by the at least one processor, perform a method comprising steps of:
      creating a usage-optimized table, wherein the usage-optimized table stores database I/O operations for one or more real tables until a flush condition is satisfied;
      associating the usage-optimized table with the one or more real tables;
      receiving an update operation for the real table;
      storing the update operation in the usage-optimized table;
      receiving a read operation, wherein the read operation requests data from the update operation and information from the real table; and
      joining the usage-optimized table and the real table to return a result for the read operation.

10. The system of claim 9, wherein the method further comprises:
    determining if the result for the read operation should be stored in the usage-optimized table; and
    based on the determination, adding the result for the read operation to the usage-optimized table.

11. The system of claim 10, wherein the determination is based upon a type of I/O read action.

12. The system of claim 10, wherein the determination is based upon the requested data and information.

13. The system of claim 10, wherein the determination is based upon access patterns.

14. The system of claim 9, wherein the read operation comprises a request to produce a view.

15. The system of claim 9, the method further comprising, after the step of joining, actualizing the update operation to the real table.

16. A computer storage medium comprising computer executable instructions that, when executed by a processor, perform a method for reducing I/O operations in a database system, the method comprising:
    creating a usage-optimized table, wherein the usage-optimized table stores database I/O operations for one or more real tables until a flush condition is satisfied;
    associating the usage-optimized table with the one or more real tables;
    receiving a database I/O operation, wherein the database I/O operation is directed towards records resident on at least two of the one or more real tables;
    storing the database I/O operation in the usage-optimized table;
    receiving a read operation;
    returning a result of the read operation;
    after returning the result of the read operation, determining that the flush condition has been satisfied as the usage-optimized table has reached a predetermined threshold; and
    upon determining that the flush condition has been satisfied, transferring the database I/O operation to the one or more real tables.

17. The computer storage medium of claim 16, wherein the predetermined threshold is based upon the size of the usage-optimized table.

18. The computer storage medium of claim 16, wherein the database I/O operation is a write operation.

19. The computer storage medium of claim 18, wherein storing the database I/O operation in the usage-optimized table further comprises storing the database I/O operation as a record comprising:
    a primary key; and
    a binary large object (BLOB) representing the database operation.

20. The computer storage medium of claim 16, wherein the predetermined threshold is based upon a timer.

* * * * *